Patented Mar. 5, 1935

1,993,279

UNITED STATES PATENT OFFICE 1,993,279

MANUFACTURE OF GOODS CONTAINING RUBBER OR SIMILAR MATERIALS

Edward Arthur Murphy and Evelyn William Madge, Wylde Green, Birmingham, England, assignors to Dunlop Rubber Company Limited, London, England, a British company No Drawing. Application March 16, 1933, Serial No. 661,191. In Great Britain March 24, 1932

8 Claims. (Cl. 18—53)

This invention comprises improvements in or relating to the manufacture of goods containing rubber or similar materials from aqueous emulsions or dispersions of the kinds hereinafter specified.

The object of the invention is to produce porous or micro-porous articles of hard vulcanized rubber or the like in admixture with fibrous materials.

According to the invention the process for the manufacture of porous or micro-porous goods of hard vulcanized rubber or the like in admixture with fibrous materials comprises admixing fibrous material with flocculent or granular precipitates produced from aqueous dispersions of the kinds hereinafter specified, effecting compacting of the aforesaid admixture of flocculent or granular precipitates and fibrous materials by a filtering operation and thereafter vulcanizing in known manner the products so obtained under such conditions that evaporation of the liquid contained therein is prevented.

The filtering operation may be carried out in conjunction with an operation such as moulding, spreading, impregnating or dipping. If desired, the filtration in the first place need only be carried out to produce a thick aqueous paste containing the flocculent or granular precipitate and fibrous material, which paste can be thereafter spread upon, for instance, coarse or fine fabrics. In the case of coarse fabric, the meshes become closed by granular precipitates. Porous moulds can be used, for example, to produce cylindrical articles of micro-porous rubber by dipping.

It has been known for some time that instead of the usual adherent coagulum, it is possible to obtain rubber as a flocculent precipitate from latex by the use of certain coagulants and by adjustment of the concentration of the latex as described, for instance, in "Estate Rubber", O. de Vries, page 143, 1920.

The aforesaid flocculent or granular precipitates can be prepared from rubber latex in controllable manner by the use of varied coagulating agents and methods of coagulation provided that the coagulation is effected in the presence of a relatively large quantity of water, and with or without the presence of certain amounts of alkaline or colloidal substances found to have a restraining effect upon the coagulation.

The fibrous materials may consist of mineral and/or vegetable fibres such as asbestos and/or cellulose fibres.

The filtering means employed may be, for example, of ceramic material, cotton fabric, or fine mesh wire gauze. If desired, suction may be employed to aid filtration and/or pressure may be applied to the filter cake.

After a large proportion of the water has been removed, a compact sheet is obtained which may be removed and moulded in wet condition and thereafter vulcanized under such conditions that evaporation of the liquid contained therein is prevented. The vulcanized product is then dried.

Examples of suitable coagulants are acetic acid, formic acid, hydrochloric acid, sulphuric acid, sodium silico-fluoride, aluminum chloride, alum, barium chloride, calcium nitrate, zinc sulphate, magnesium acetate, magnesium sulphate, ferrous sulphate, and ferric sulphate.

Examples of substances having a restraining effect on the coagulation are caustic potash, casein, sodium aluminate, glue and gum acacia. The amount of such substances used also influences the degree of subdivision of the granular dispersion.

The degree of concentration has also an influence on the fineness of the precipitate. In general, the lower the concentration, the finer the initial precipitate.

The aqueous dispersions aforesaid are preferably employed at such dilutions that 100 ccs. thereof contain not more than 10% of total solids.

By the suitable choice of reagents and conditions of working, granular dispersions of varying consistency can be formed.

If desired, the granular precipitates can be washed free from soluble reaction products, such as soluble sulphates or chlorides, by known means as, for instance, by decantation or filtration and washing prior to their compacting.

The emulsions or dispersions of rubber or the like may contain in addition to rubber, guttapurcha, balata, or similar vegetable resins occurring naturally or artificially. Such artificial aqueous dispersions may include those of coagulated rubber, vulcanized rubber, synthetic rubber, waste or reclaim.

Any of the aforesaid dispersions may contain the usual known compounding and vulcanizing ingredients and/or may be in the first instance in concentrated form.

It is desirable that the proportion of vulcanizing ingredient should be high.

Concentrates such as are obtained in Patent 1,846,164, Feb. 23, 1932, or in British Patent 219,635, to which may be added any one or more of the usual known compounding ingredients, may also be employed subsequent to dilution.

The aforesaid vulcanization and/or compounding ingredients which are added in the form of their dispersions may be added to the aforesaid aqueous emulsions or dispersions of rubber or the like prior or subsequent to the precipitation of the granular or flocculent coagula.

It is preferable to add the aforesaid dispersions of the vulcanizing and other compounding ingredients before the precipitation of the granular precipitates.

Should it be necessary, conversion into a compact, uniform mass can be hastened and facilitated by treating the filter cake obtained with a rubber solvent as, for instance, carbon tetrachloride, which may be mixed with a mutual solvent for water and the rubber solvent employed, as for example, alcohol.

In carrying out the process of the present invention, it has been found that the presence of asbestos in most cases makes it unnecessary to employ means for maintaining the wet coherent mass during vulcanization in a distended condition.

For instance, according to the present invention, it has been found to be usually unnecessary to place the wet coherent mass between plates having, for instance, embossed patterns on their surface, or between layers of fabric material so as to prevent any shrinkage of the wet coherent mass during the vulcanization.

The following example illustrates how the process can be effected for the production of microporous filters.

A latex mixing having the following compositions:

| | Parts by weight |
|---|---|
| Rubber | 100 |
| Sulphur | 40 |
| Zinc oleate | 3 |
| Mercaptobenzthiazole | 0.5 |
| Mineral oil | 10 |
| China clay | 10 |
| Zinc oxide | 2 | is prepared from a 60% rubber latex obtained by centrifugal action.

The mixing is compounded and concentrated according to the processes described and claimed in Patents 1,846,164 and 1,898,604.

The final solid content of the mixing is 53%.

This mixing is converted into a granular precipitate in the following manner—

To 280 parts by weight of the mixing 1.8 parts by weight of 25% solution of caustic soda, 9 parts by weight of a 10% solution of casein, 1150 parts by weight of water are added. To this diluted mixing 11 parts by weight of sodium silicate (50% concentration) in the form of a 10% solution, 11 parts by weight of magnesium sulphate crystals in the form of a 10% solution are added; the mixture being well stirred after each of the additions.

The dispersion of asbestos is prepared by agitating 150 parts by weight of asbestos fibre with 2850 parts by weight of water, by any suitable means, as for instance, by the use of a beating engine.

The rubber precipitate is then added to the asbestos pulp and the agitation continued for a short period. The flocculent or granular precipitate of rubber and asbestos is poured onto a suitably constructed filter so as to give filter cakes of the desired dimensions and patterns for immediate vulcanization with or without the removal of the filter cakes from the press.

It may be desirable to remove excess of water from the sheets by passing them through rolls. The sheets still containing a predetermined amount of water are placed in a mould which is then clamped and placed in hot water and subjected to steam pressure, care being taken that the mould is totally immersed during the vulcanization.

Good vulcanization can be made to take place in 1¾ hours at 80 lbs. pressure of steam, after which the mould is cooled before opening, and the filters produced are rinsed and allowed to dry.

The porous ebonite filters produced according to this example have been found to have a high degree of porosity and to have good flexibility.

Having now particularly described our invention, what we claim is:—

1. A process for the manufacture of porous or micro-porous goods of vulcanized rubber in admixture with fibrous materials which comprises mixing fibrous materials with flocculent or granular precipitates in aqueous suspension produced from aqueous dispersions of rubber material, filtering the aforesaid mixture of flocculent or granular precipitates and fibrous materials to a compact mass and vulcanizing the products so obtained while preventing evaporation of the liquid contained therein.

2. A process as claimed in claim 1 wherein after a large proportion of the water has been removed from the mixture by a filtering operation the compact sheet obtained is removed from the filter and moulded in wet condition and thereafter vulcanized under such conditions that evaporation of the liquid contained therein is prevented.

3. A process for the manufacture of porous or micro-porous goods of vulcanized rubber in admixture with fibrous materials which comprises mixing fibrous materials with flocculent or granular precipitates in aqueous suspension produced from aqueous dispersions of rubber material, separating the aforesaid mixture of precipitates of fibrous materials in a compact mass from the dispersing liquid and thereafter vulcanizing the separated material while preventing evaporation of the liquid contained therein.

4. The process of claim 3, in which the separated mass is moulded in wet condition before vulcanization.

5. The process of claim 1 in which excess of water is removed from the filtered material by passing it in sheet form between rolls.

6. The process of claim 1 in which said flocculent precipitates are produced with simultaneous precipitation of a silicate.

7. The process of claim 1 in which said flocculent precipitates are produced with simultaneous precipitation of magnesium silicate.

8. A process for the manufacture of porous or microporous goods of vulcanized rubber in admixture with fibrous materials which comprises adding to an aqueous dispersion of rubber material containing an alkali silicate in solution, a magnesium salt having ions that coagulate the dispersion to produce flocculent or granular precipitates as compounded rubber containing magnesium silicate, mixing said precipitates with fibrous materials, filtering the resulting mixture of precipitates and fibrous materials to a compact mass, and vulcanizing the product so obtained while preventing evaporation of the liquid contained therein.

EDWARD ARTHUR MURPHY.
EVELYN WILLIAM MADGE.